Dec. 27, 1938.  R. H. PATRICK  2,142,034
WORK HOLDER MECHANISM FOR MACHINE TOOLS AND THE LIKE
Filed May 29, 1936  3 Sheets-Sheet 2
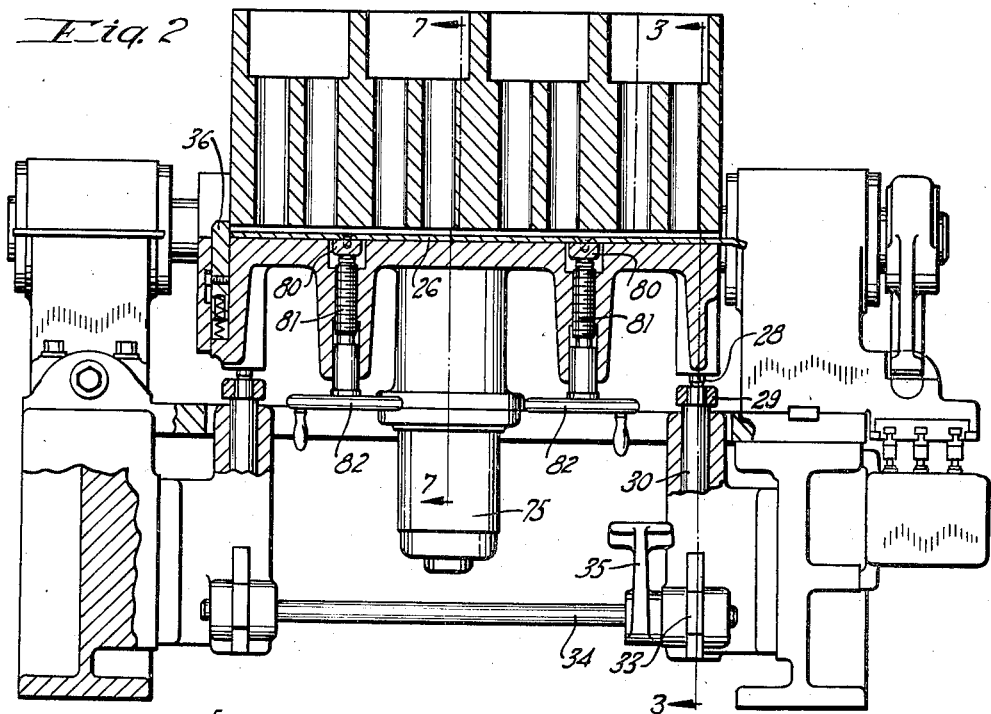
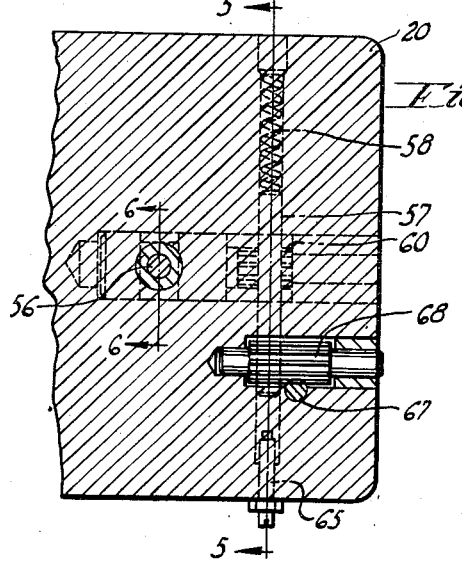
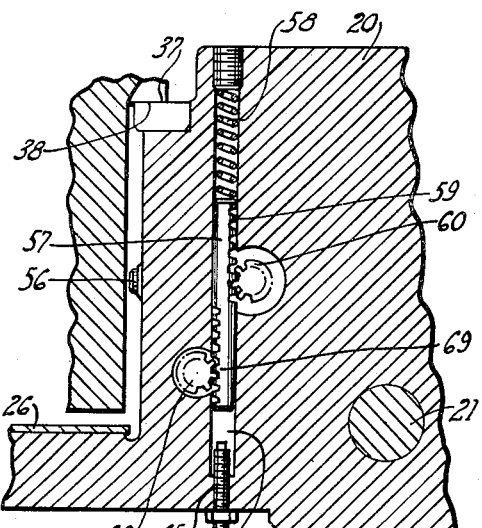
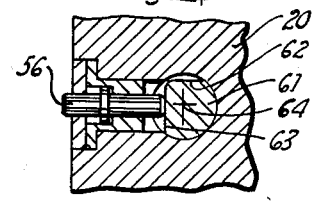
INVENTOR.
ROLLIN H. PATRICK
BY
A. H. K. Parsons
ATTORNEY.

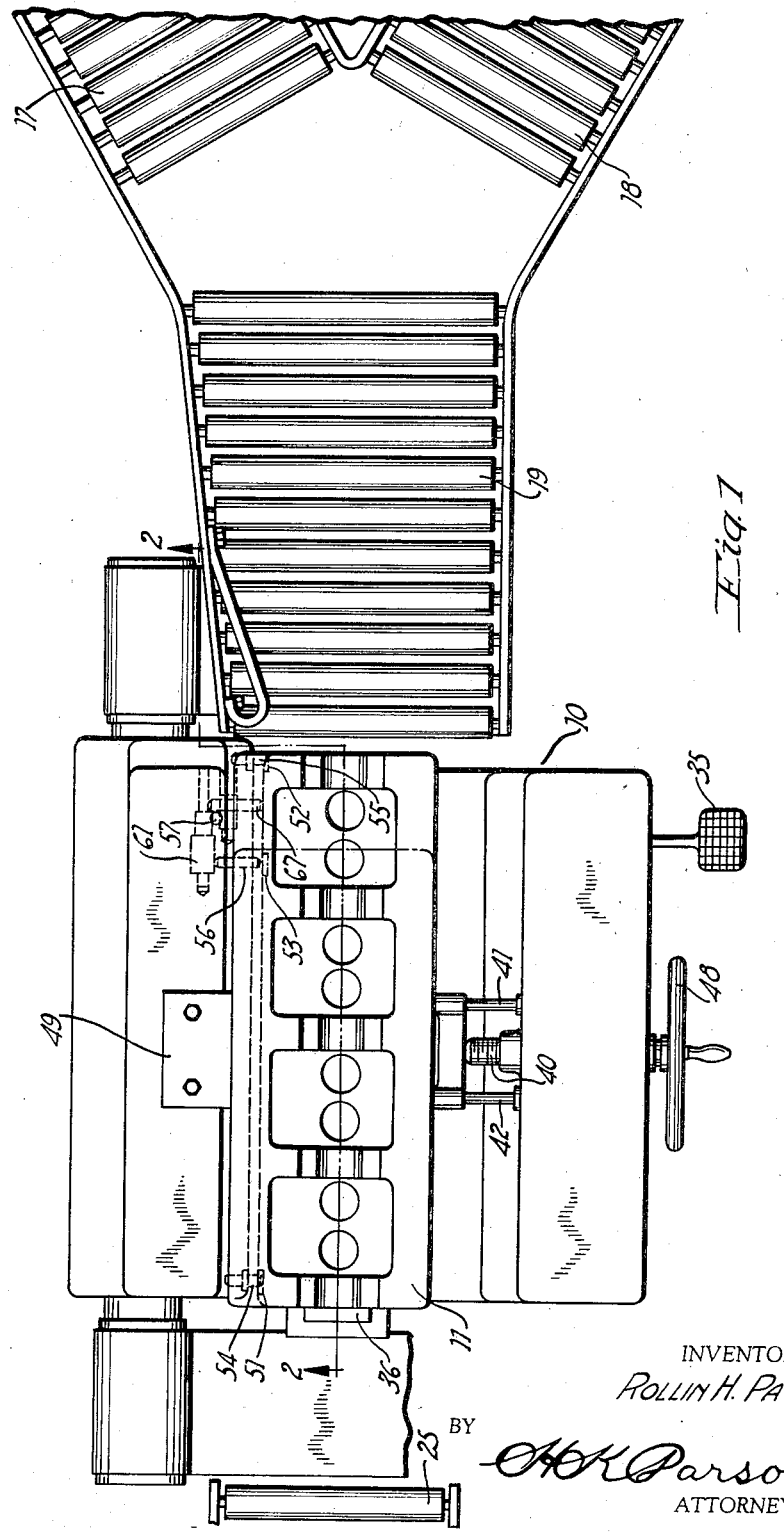

Dec. 27, 1938.  R. H. PATRICK  2,142,034
WORK HOLDER MECHANISM FOR MACHINE TOOLS AND THE LIKE
Filed May 29, 1936  3 Sheets-Sheet 3
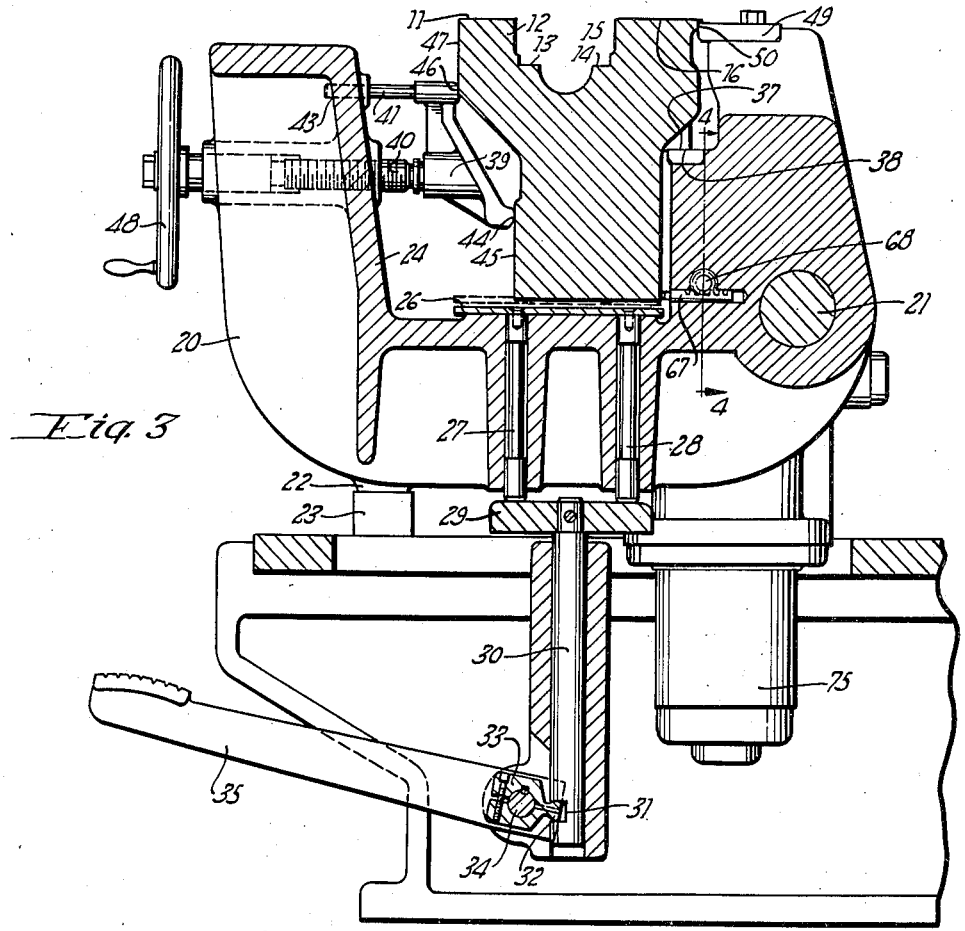
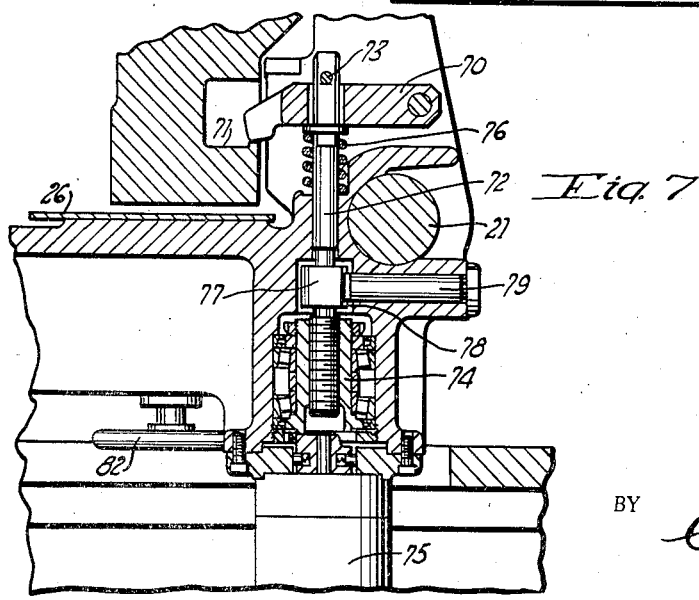
INVENTOR.
ROLLIN H. PATRICK
BY
H. K. Parsons
ATTORNEY.

Patented Dec. 27, 1938

2,142,034

UNITED STATES PATENT OFFICE 2,142,034

WORK HOLDER MECHANISM FOR MACHINE TOOLS AND THE LIKE

Rollin H. Patrick, Deer Park, Ohio, assignor to The Cincinnati Milling Machine Co., Cincinnati, Ohio, a corporation of Ohio Application May 29, 1936, Serial No. 82,567

12 Claims. (Cl. 90—59)

This invention relates to machine tools and more particularly to improvements in work holding mechanisms therefor.

One of the objects of this invention is to provide a work holding mechanism which is adapted to receive and accommodate different sizes of work pieces which are promiscuously fed thereto and without requiring the operator to perform any additional duty in securing the work pieces when a change in size occurs.

Another object of this invention is to provide a work holder with selective work locating means which will cooperate with locating surfaces which are differently spaced on different sized work pieces.

A further object of this invention is to provide an improved work holding mechanism which is adapted to receive a promiscuous supply of different work pieces having differently positioned locating surfaces thereon and automatically select locating means in accordance with the size of the work for engaging the respective locating surfaces and thereby properly position the work in the holder regardless of its size.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 1 is a plan view of a mechanism illustrating the principles of this invention.

Figure 2 is a section through the work holding mechanism taken on the line 2—2 of Figure 1.

Figure 3 is a section on the line 3—3 of Figure 2.

Figure 4 is a detailed section on the line 4—4 of Figure 3.

Figure 5 is a section on the line 5—5 of Figure 4.

Figure 6 is a detailed section on the line 6—6 of Figure 4.

Figure 7 is a section on the line 7—7 of Figure 2.

In Figure 1 of the drawings the reference numeral 10 indicates generally the work holding mechanism which may be utilized in connection with a machine tool for precision locating and clamping of a work piece with respect to a metal removing tool, and although the mechanism as shown is especially adaptable for use in connection with a broaching tool, it is to be understood that it may be successfully utilized with other types of traveling metal removing tools without departing from the basic principles involved.

In the production of articles in large manufacturing plants, it often occurs that a given article is manufactured in a plurality of sizes, but the cross sectional contour of a given face on all sizes of work may be the same and may therefore be finished on the same machine, the only difference residing in the fact that one work piece is longer than the other.

It is conventional practice to provide special locating surfaces or to utilize existing finished surfaces on the work for locating purposes, and if these are located at opposite ends of the work piece it will be apparent that with work pieces of different length that these surfaces will be differently spaced and, therefore, cannot cooperate with one set of locating elements in the work holder.

This sometimes results in the necessity of running the work through in lots of different sizes and changing the set-up of the machine for each different lot. The supply and demand of such work in a production schedule may be such that this is not practical or feasible and the work fixture of this invention has, therefore, been designed to obviate this necessity and make it possible to handle a promiscuous supply of different sized parts and successively accommodate them in the machine without the necessity of the operator taking time to make a change in the set-up of the machine, or otherwise affecting his normal duties.

For exemplary purposes, it may be assumed that the work is an engine block which is to be produced in different lengths dependent upon the number of cylinders, but the cross section of each block, regardless of length, is the same and such a cross section is shown in Figure 3 of the drawings. The purpose of this invention is to provide a fixture which will locate and hold successive work pieces as they are fed to the machine in such a manner that the surfaces 11, 12, 13, 14, 15 and 16 may be machined in one stroke of a tool, such as a broach moving parallel to these surfaces. From this it will be obvious that if the length of the stroke of the tool is sufficient to finish the longest work piece that is fed to the machine that it will be sufficient to machine the shorter work pieces.

As shown in Figure 1, the different length work pieces may be promiscuously supplied to the fixture from branch conveyors 17 and 18, those of one length coming from a source over conveyor 17, for instance, and those of a different length coming from a second source over conveyor 18. These branch conveyors may be united in a common conveyor 19 leading to the mouth of the fixture. The fixture comprises a U-shaped member 20 which may be supported on one side of a shaft 21 and on the other side by bosses 22, which rest on supports 23.

The fixture has a medial channel 24, into one end of which work pieces are successively fed from the conveyor 19 and after the work is machined, it continues on through the fixture and out at the other end on to conveyor 25.

In the bottom of the channel or trough 24 is a work receiving platform 26 which is adapted to be elevated through the following means to raise the work for precision location in a vertical plane. The platform 26 consists of a steel plate to which is attached near each end thereof a pair of plungers, such as 27 and 28 shown in Figure 3. The ends of these plungers are adapted to be engaged by the cross member 29 attached to the upper end of a vertically reciprocable rod 30. The lower end of this rod has a notch 31 formed therein for receiving the ball-shaped end 32 of a crank 33, keyed to shaft 34. This shaft also has keyed thereto a foot pedal 35. When the operator steps on the end of the foot treadle the shaft 30 is raised, thereby transmitting motion through the plungers 27 and 28 to the platform 26. As shown in Figure 2, the shaft 34 extends lengthwise to the other end of the platform, at which there is provided another mechanism similar to that shown in Figure 3 so that force is applied to both ends of the platform 26 for the purpose of elevating the work.

When the work is moved onto the platform it is moved a sufficient distance to engage an end stop 36 which approximately locates the work lengthwise of the fixture. The work is then elevated by means of the mechanism operated by the foot treadle so that a finished shoulder 37 located on the side of the work may slide onto the locating ledge 38. This means that after the work has been elevated, it must be moved laterally and the mechanism for effecting this movement comprises the pusher and clamping member 39 mounted on the end of the actuating plunger 40. In order to prevent rotation of the member 39 a pair of guide rods 41 and 42 are secured to the member and are slidable in fixed bores 43 formed in the wall of the fixture. The member 39 has one finger 44 which engages the surface 45 of the engine block which it will be noted is located below the shoulder 37, and another finger 46 which engages the surface 47 of the engine block which it will be noted is above the shoulder 37. The member 40 is threaded in the wall of the fixture and on the outer end is provided with a hand wheel 48.

The operator thus raises the work by operation of the foot treadle 35 and then by rotation of the hand wheel 48 forces the work laterally onto the ledge 38 which locates the work vertically and determines the location of the finally finished horizontal surfaces on the work.

In addition, it is necessary to provide locating stops to hold the vertical axis of the work in a vertical plane so that the surfaces 11, 13, 14 and 16 will be finished square to this axis, and to this end an upper stop 49 is provided as shown in Figures 1 and 3 and this is attached to the upper side of the fixture for engagement by the locating surface 50 on the work. It will be noted from Figure 1 that this stop is located directly opposite to the clamping member 49 and that it is located in a plane which is above the plane of contact of the finger 46 with the surface 47. This means that if nothing else were provided that the lower end of the work would be tilted laterally, thereby throwing the work out of vertical alignment. To prevent this, the work is provided at its opposite lower ends with finished locating surfaces, the long work pieces being provided with surfaces 51 and 52 and the short work pieces with surfaces 51 and 53. A pair of fixed stops 54 and 55 are provided in the fixture for engaging the locating surfaces 51 and 52 when the work is moved laterally upon rotation of the hand wheel 48.

A removable stop 56 is provided for engaging the surface 53 when short work pieces are in the fixture, and means are provided whereby this stop will automatically be moved into a work locating position when a short work piece is in the fixture and will be automatically removed when a long work piece is in the fixture because its presence will interfere with the proper locating of long work pieces because the latter are not provided with any depression opposite the removable stop 56 to prevent interference therefrom. Means are provided for normally holding the stop 56 projected and include a rack plunger 57 which, as shown in Figure 5, is normally urged downward by a spring 58. The rack plunger has a first set of rack teeth 59 which engage pinion teeth 60 cut in the periphery of a rotatable member 61. This member, as shown in Figure 6, has a first flat side 62 formed thereon and a second flat side 63 which is formed thereon at right angles to the side 61, but which is located nearer to the axis of rotation 64 of the member 61 than the side 62. When the rack plunger 57 is moved downward under the influence of spring 58 the member 61 is rotated counterclockwise as viewed in Figures 5 and 6, which thereby positions the surface 62 behind the plunger 56 and moves the same outward to its work locating position. Since the surface 62 is flat it forms a solid backing for the member 56 so that the work can be clamped against it and be properly located. To insure that the surface 62 is located in a plane square with the plunger 56, a set screw 65 is threaded in the end of the bore 66 which contains the plunger 57 to restrict axial movement of the plunger 57 to the proper amount.

When long work pieces are inserted in the fixture and it is desirable to have this stop removed, a second plunger 67 is reciprocably mounted in the fixture 10 and it has rack teeth cut thereon which interengage an elongated pinion 68 which also intermeshes with a second set of rack teeth 69 formed on the plunger 57.

When the long work pieces are moved laterally by rotation of the hand wheel 48 the work engages the end of plunger 67, thereby rotating the pinion 68 in a counterclockwise direction as viewed in Figure 5, which causes upward movement of plunger 57 and clockwise rotation of member 61, thereby positioning the surface 63 thereon behind the stop 56 and permitting the work to cause sufficient retraction thereof so that it will not interfere with the proper location of the work by the members 54 and 52.

It will now be seen that regardless of the length of the work pieces or the spacing of the locating surfaces thereon that the end stop 36 locates the work longitudinally of the fixture and the operator in each case only has to press the foot treadle to elevate the work and operate the hand wheel 48 to clamp the same, the locating stops automatically functioning in accordance with the length of work.

Additional clamping means may be provided for holding the work against the ledge 38 and this may consist of a pivoted clamping finger 70 which is adapted to engage a depression 71 formed on the side of all work pieces and through which passes a plunger 72. This plunger passes through the member 70 and is provided with a cross pin 73 for engaging the upper side of the clamping finger for moving the same downward when a nut 74, which is threaded on the lower end of member 72 is rotated by a torque motor, indicated generally by the reference numeral 75. A spring 76 is interposed between a fixed surface on the fixture and the underside of the clamping finger 70 to raise the same out of engagement with the work when the plunger 72 is elevated. The member 72 is provided with an enlarged boss 77, in the side of which is formed a groove 78 for engagement with a detent 79 which holds the member 72 against rotation when the nut 74 is power rotated.

For the purpose of backing up the work after the same has been elevated, the plate 26 is provided on the under side with a pair of bosses 80, as shown in Figure 2, against which bear the backing-up screws 81 having manually operable hand wheels 82 secured to the end thereof. By rotating these hand wheels the plate is held against the underside of the work after the foot treadle has been released. Since there is no direct connection between the screws 81 and the members 80 the plate may be elevated upon operation of the foot treadle without interference therefrom.

There has thus been provided an improved work holder for the purposes described, which will accommodate a promiscuous supply of different work pieces and in which the operations of securing the work are the same from an operator's viewpoint, regardless of the size of work.

What is claimed is:

1. In a work holding mechanism, the combination with a work holder, of different means in the work holder for locating different sized work pieces, means normally operative for rendering one of said locating means effective for determining the position of one size of work piece, and a plunger responsive to the presence only of a different sized work piece to render said first locating means ineffective.

2. In a work holding mechanism, the combination with a work holder, of a first means for positioning one size of work piece in the holder, a second means effective for positioning a different size of work piece in the holder, resiliently operable means for normally rendering one of said means effective, and a positive acting device for rendering the last named means ineffective.

3. In a work holding mechanism, the combination of a work holder having a work receiving trough formed therein, a positive stop for positioning work longitudinally of the trough, a first work locating stop at the side of the trough for engaging a work locating surface on all work pieces, a second work locating stop at the side of the trough for engaging a work locating surface on long work pieces, a third work locating stop at the side of the trough for engaging a work locating surface on short work pieces only, and means for automatically rendering said last-named stop ineffective when long work pieces are in said holder.

4. In a work holding mechanism, a work receiving trough, means for positioning and clamping a work piece in said trough including a pair of fixed work locating stops suitably spaced for engaging locating surfaces on the longest work piece to be placed in said trough, a removable work locating stop for engaging a surface on shorter work pieces, a rotatable member for projecting said removable stop into an effective position including a positive abutment for holding the same in its effective position, said member also including means upon rotation thereof to a second position for permitting retraction of said removable stop to an ineffective position.

5. In a work holding mechanism, the combination of means for locating and clamping different sized work pieces therein including a pair of fixed locating stops for engaging corresponding surfaces on one size of work piece for positioning the same, an adjustable stop operating with one of said fixed stops for positioning another size of work piece in said work holder, means for advancing and retracting said adjustable stop including a rotatable member engageable with the end of said stop, a plunger for rotating said member, resilient means effective on one end of said plunger for normally moving the stop to its advanced position, and positive acting means engaging the other end of said plunger for shifting said rotatable member to a second position to permit retraction of said stop.

6. In a mechanism of the class described, the combination of a work holder having a longitudinal work receiving trough formed therein, a pair of fixed work locating stops mounted at one side of said trough and spaced to engage similarly spaced locating surfaces on one side of a work piece, a shiftable work locating stop disposed adjacent the fixed stops for cooperation with a different length of work piece, and work engaging means coupled with the shiftable stop for determining the effective positioning thereof.

7. A work holding mechanism of the character described including a first abutment member for lateral engagement with a work piece, an opposed clamp member for urging the work piece in the direction of the abutment, and additional work limiting abutments disposed in a plane distinct from that of the two first-named members, said additional abutments including a shiftable stop member, and control means for the shiftable stop member including a work engageable selector for determining the effectiveness of said member.

8. In a work holding mechanism of the character described, the combination with a primary work engaging abutment and an opposed work clamp disposed in offset relation thereto, of a series of potential work engaging abutments for limiting tilting movement of the work about the first abutment under influence of the clamp, and a work engageable selector for determining the relative effectiveness of the abutments of the series.

9. In a mechanism of the character described, the combination with spaced work engaging and clamping members for securing a work piece in position for a machining operation, of stops for limiting movement of the work under influence of the clamp, said stops including a shiftable member, a variable positionable abutment for selectively limiting the amount of movement of the shiftable stop, and a work operable selector for determining the position of the abutment and thus the effectiveness of the stop.

10. A work receiving fixture for interposition in a conveyor line for securing a work piece during performance of a machining operation thereon, said fixture including a trough-like portion for reception of the work piece having an elevatable base for reception of the work and having at one side a plurality of lateral work engaging devices and at the opposite side a work clamp member intermediately opposing said device, a treadle operated elevating device for raising the work and base into machining position, clamp means for securing the base in elevated position, and means for actuating the lateral clamp whereby the work is laterally shifted on the clamp base into engagement with the opposed lateral work engaging devices.

11. A work receiving fixture for interposition in a conveyor line for securing a work piece during performance of a machining operation thereon, said fixture including a trough-like portion for reception of the work piece having an elevatable base for reception of the work and having at one side a plurality of lateral work engaging devices and at the opposite side a work clamp member intermediately opposing said device, a treadle operated elevating device for raising the work and base into machining position, clamp means for securing the base in elevated position, means for actuating the lateral clamp whereby the work is laterally shifted on the clamp base into engagement with the opposed lateral work engaging devices, a selector in position to engage the work upon lateral shifting thereof, and means operable by the selector for determining the relative effectiveness of certain of said lateral work engaging members.

12. A work receiving fixture for interposition in a conveyor line for securing a work piece during performance of a machining operation thereon, said fixture including a trough-like portion for reception of the work piece having an elevatable base for reception of the work and having at one side a plurality of lateral work engaging devices and at the opposite side a work clamp member intermediately opposing said device, a treadle operated elevating device for raising the work and base into machining position, clamp means for securing the base in elevated position, means for actuating the lateral clamp whereby the work is laterally shifted on the clamp base into engagement with the opposed lateral work engaging devices, and a trunnion member pivotally supporting the work engaging fixture whereby the same may be tilted out of engagement with the elevating treadle mechanism and retained in selected position in the fixture by the respective clamping abutment devices.

ROLLIN H. PATRICK.